United States Patent [19]

Joh et al.

[11] 4,385,017

[45] May 24, 1983

[54] METHOD OF MANUFACTURING HOLLOW FIBER

[75] Inventors: Yasushi Joh; Masahiro Yamazaki, both of Yokohama; Noriaki Kaneko, Kamakura; Shigehiko Oikawa, Sagamihara; Yoshihiro Makuta, Kawasaki; Chizuko Hayashi, Yokohama, all of Japan

[73] Assignee: Nippon Zeon Co., Ltd., Tokyo, Japan

[21] Appl. No.: 273,306

[22] Filed: Jun. 15, 1981

Related U.S. Application Data

[63] Continuation of Ser. No. 116,947, Jan. 30, 1980, abandoned, which is a continuation-in-part of Ser. No. 91,491, Nov. 5, 1979, abandoned, which is a continuation of Ser. No. 918,808, Jun. 26, 1978, abandoned.

[30] Foreign Application Priority Data

Jun. 30, 1977 [JP] Japan ................................. 52/78083
Jun. 30, 1978 [FR] France ................................. 78 19710

[51] Int. Cl.³ ............................................. B29D 27/00
[52] U.S. Cl. ..................................... 264/41; 264/561; 264/182; 264/209.1; 428/398
[58] Field of Search .............. 264/41, 182, 561, 209.1; 210/500.2; 428/398

[56] References Cited

U.S. PATENT DOCUMENTS

| | | |
|---|---|---|
| 3,674,628 | 7/1972 | Fabre ................................. 264/182 |
| 3,888,771 | 6/1975 | Isuge et al. ......................... 264/199 |
| 4,051,300 | 9/1977 | Klein et al. ........................... 264/49 |
| 4,234,431 | 11/1980 | Mishiro et al. ..................... 264/200 |
| 4,322,381 | 3/1982 | Joh ..................................... 264/41 |
| 4,323,627 | 4/1982 | Joh ..................................... 264/41 |

FOREIGN PATENT DOCUMENTS 50-132218 10/1975 Japan.

*Primary Examiner*—Jay H. Woo
*Attorney, Agent, or Firm*—Armstrong, Nikaido, Marmelstein & Kubovcik

[57] ABSTRACT

A method of manufacturing a microporous hollow fiber having a high permeability to water characterized in that a spinning solution of (A) polyacrylonitrile, (B) an acrylonitrile copolymer, or (C) an admixture of (A) and (B) in an organic solvent is extruded from an annular slit, while simultaneously extruding an organic core liquid which is a solvent for (A), (B) and (C) or a swelling agent capable of swelling them from an orifice encircled by the annular slit and introducing the extruded spinning solution with the core liquid into an aqueous coagulating bath to coagulate the spinning solution to form the hollow fiber.

10 Claims, No Drawings

METHOD OF MANUFACTURING HOLLOW FIBER

CROSS-REFERENCE TO RELATED APPLICATIONS

This is a continuation of application Ser. No. 116,947, filed Jan. 30, 1980 and now abandoned, which is a continuation-in-part of copending application Ser. No. 91,491, filed Nov. 5, 1979 and now abandoned, which is a continuation of application Ser. No. 918,808 filed June 26, 1978 and now abandoned.

BACKGROUND OF THE INVENTION

1. Field of the Invention

This invention relates to a method of manufacturing a hollow fiber and, more particularly, to a method of manufacturing a hollow fiber having favorable selective permeability.

2. Description of the Prior Art

Hollow fibers are widely used in various fields. A method of manufacturing a hollow fiber has been investigated in order to impart various performances to the hollow fibers.

Examples of the successful use of hollow fibers are a hollow-fiber type artificial kidney, a hollow-fiber type module for reverse osmosis, a hollow-fiber type ultrafiltration module and a hollow-fiber type reverse-osmosis condenser.

Artificial kidneys are used for patients suffering from renal failure. Metabolic waste such as urea and uric acid are selectively removed from the blood of a patient by an artificial kidney. A well-balanced ultrafiltrating property or dewatering property with the removal of metabolic waste is required of an artificial kidney.

Hollow fibers are also used for reverse osmosis, for example, for desalting sea water. A good water-flux and rejecting property against salt are required for reverse osmosis. Hollow fiber type modules are also used for treating polluted water from factories and for producing sterile water.

Hollow fiber type reverse osmosis condensers are also used in the food industry for condensing juice. This method is advantageous because it causes a minimum loss of vitamins during the condensation process. Also, because heat is not used in this method, it saves energy.

In using hollow fibers, a fluid to be treated flows through the hollow portions of said fibers. Accordingly, the hollow portion should extend longitudinally through the whole length of each fiber. The membrane of the hollow fiber should not be even partially broken. Further, it is required that the thickness of the membrane of the hollow fiber be uniform over the fiber's whole length and that the diameter of the fiber be as small as possible, thereby to provide sufficient mechanical strength.

A conventional method of manufacturing a hollow fiber comprises extruding a spinning solution (dope) from an annular slit of a double pipe orifice to form a sheath solution, while simultaneously extruding a gaseous or liquid fluid from the inner pipe of the double pipe orifice to form a core fluid. A liquid core fluid is superior to a gaseous core fluid for stable spinning. The core liquids of the prior art can be classified into two categories, to wit:

CATEGORY I

A liquid having no compatibility with a spinning solution (sheath liquid or sheath solution) is used as core liquid in this category. For example, a cuprammonium solution of cellulose is extruded as a sheath solution from the double pipe orifice and, simultaneously, an organic solvent (core fluid or core liquid or core solvent) having no compatibility with water is extruded as a core solution from the inner pipe orifice (Japanese Laid Open Patent Application Nos. 40168/1975, 59518/1975 and 31912/1974). In these documents, the use of octyl alcohol, benzene, toluene, styrene, light oil, kerosene, perchloroethylene, trichloroethylene, methylchloroform and liquid paraffin as core liquid (core solution) are disclosed. The resulting spun dope filament is not miscible with the core solution. The dope filament forms a phase separate from the core solution. Thus, mutual diffusion between the solvent component of the sheath solution and the core liquid is suppressed. Accordingly, gellation or coagulation of the spinning dope filament does not develop until said filament is immersed in a coagulating bath. For this reason, the spinnability is satisfactory and a high speed of spinning is possible. However, such method has a disadvantage in that it requires much labor and time to remove the core solution from the manufactured hollow fiber, and the removal of the core liquid from the hollow fiber is always imperfect because the core solution is inherently incompatible with water.

In a modification of Category I previously proposed by the inventors of the invention described and claimed herein for the manufacture of hollow fibers, an aqueous salt solution is used as core liquid. Said salt solution contains an amount of the salt effective for causing a phase separation between the core liquid and the sheath solution because of a salting-out effect (See Japanese Patent Application Nos. 77447/1976 and 143115/1976).

This salt solution is classified in Category I because, although it is an aqueous solution, its salt content renders it incompatible with an organic cellulose solution comprising the sheath solution. In a dry-jet wet spinning process using the core liquid (salt solution) of this embodiment of Category I, the resulting spun-dope filament runs through a gaseous space of an appropriate length before it is introduced into a coagulating bath. The gellation of the spun filament is not developed by the core liquid in the passage that the filament is running through the gaseous space. Accordingly, the spinnability is excellent. Thus, the high speed spinning is possible.

In another modification of Category I described in Japanese laid-open patent application 132218/1975, the core solvent is essentially the same as the sheath solvent, but it contains a polymer dissolved therein which differs in type from the polymer of the sheath solution (i.e., the polymer dissolved in the sheath solvent). Phase separation between the sheath solution and the core solution results because different types of polymers are present in the two solutions (the core solution or core liquid on the one hand, and the sheath solution or spinning solution on the other). Unfortunately, it is difficult to remove the core liquid from the manufactured hollow fiber, thereby making the use of such core liquid practically impossible and economically unattractive.

CATEGORY II

In this category, water or an aqueous solution is used as core liquid. The aqueous solution is usually a mixture of water and the solvent of the sheath solution. Diffusion rapidly occurs between the sheath solution and the core liquid. Since the coagulating function of water is highly effective, the spun-dope filament (the filament resulting from extruding the sheath liquid through an annular slit while simultaneously extruding the core liquid from an orifice encircled by the annular slit) is almost instantaneously gelled by the action of the core liquid immediately after being spun. Accordingly, the spinnability is very poor and the draft ratio, which is the ratio of linear speed of spun-dope filament to take-up speed on a take-up roll, is also very small. Thus, the spinning speed is at most 5 to 15 meters per minute. However, the resultant hollow fibers have characteristic properties, for example, in selective permeability, and are known to be suitable for ultrafiltration. Hollow fibers from cellulose acetate and vinyl halide (Japanese Laid Open Patent Application No. 80686/1976) and from acrylonitrile polymer (Japanese Laid-Open Patent Application No. 6532/1974) have been prepared using Category II.

When the core liquid of the above-described Category II spinning speed is low as already described, the spinning solution is rapidly gelled because of the rapid coagulating of the core liquid. However, structure having high water-flux is imparted to the resultant hollow fiber which is useful as an ultrafiltration membrane. A method to improve the spinning speed is proposed in Japanese Laid-Open Patent Application No. 13424/1974, in which the gellation of a spun solution of cuprammonium cellulose is suppressed by using chilled water as a core solution. However, it should be noted that none of the Category II core solutions known so far are solvents for the sheath polymer; they act to coagulate and gellate the spun filament.

U.S. Pat. No. 4,051,300 teaches a method for preparing hollow synthetic fibers comprising:

(1) forming a solution of a fiber-forming first polymer material in a suitable solvent and adding to the solution a second polymer having an average molecular weight of at least 2000 to form a solution stable on extrusion, but undergoing phase separation when the total polymer concentration increases on coagulation;

(2) extruding the resulting solution through an orifice equipped for coaxial extrusion so that flow results;

(3) precipitating the first polymer by use of a precipitating liquid miscible with the polymer solvent and a solvent for the second polymer by contacting the extruded polymer solution with the precipitating agent either coaxially through the extrusion device or on the outside of the extrudate by conveying the extrudate through the precipitating agent to form a hollow fiber; and (4) washing the hollow fiber free of residual solvents and non-solvents.

If the two-polymer spinning solution is not stable up to the point of extrusion, voids may occur in the fibers. This patent (U.S. Pat. No. 4,051,300) also teaches that solutions used to spin acrylonitrile polymers by such method tend to be unstable, making it necessary to take steps to avoid the formation of voids in hollow fibers prepared from acrylonitrile and that polyethylene glycol has been added to acrylonitrile solutions to produce void-free fibers. Also, U.S. Pat. No. 4,051,300 teaches that fibers prepared from acrylonitrile polymers according to such teachings are not microporous.

U.S. Pat. No. 3,871,950 teaches a method for preparing water-permeable hollow fibers from an acrylonitrile polymer comprising extruding a spinning solution which is an acrylonitrile polymer dissolved in nitric acid from an annular slit while simultaneously extruding a core liquid (water, n-heptane, chlorothene, cyclohexane, kerosene or nitric acid) from an orifice encircled by the annular slit and introducing the extruded spinning solution with the core liquid into a coagulating bath (water or water containing up to 30% nitric acid) to coagulate the spinning solution and form the hollow fiber.

SUMMARY OF THE INVENTION

It is an object of this invention to provide a method for manufacturing a microporous hollow fiber having a high water permeability from polyacrylontile or an acrylonitrile copolymer whereby the hollow fiber can be manufactured at high speed.

Another object of this invention is to provide a method of manufacturing such a hollow fiber whereby a uniform hollow fiber can be stably manufactured.

A further object of this invention is to provide a method of manufacturing a microporous hollow fiber having a high water permeability from polyacrylonitrile or an acrylonitrile copolymer which can be used for various purposes.

It is a further object in accordance with one aspect of this invention to provide a method of manufacturing a hollow fiber comprising the steps of:

(a) extruding a spinning solution of high molecular weight compound from an annular slit, said high molecular weight compound consisting of at least one polyacrylonitrile and acrylonitrile copolymer;

(b) simultaneously extruding a core liquid comprising at least one of an organic solvent for said high molecular weight compound and an organic swelling liquid (a liquid which can swell said high molecular weight compound) from an orifice encircled by said annular slit; and (c) then introducing said extruded spinning solution with said core liquid into a coagulating bath containing water or mainly water, said spinning solution being coagulated in said coagulating bath.

Various other objects, advantages and features of the present invention will become readily apparent from the ensuing detailed description, and the novel features thereof will be particularly pointed out in the appended claims.

DESCRIPTION OF THE PREFERRED EMBODIMENTS

According to one preferred embodiment, an acrylonitrile copolymer or polyacrylonitrile dissolved is an organic solvent is extruded from the annular slit of a double pipe orifice. Simultaneously, dimethyl sulfoxide (DMSO) or a liquid containing DMSO is extruded as core liquid from the inside pipe of the double pipe orifice.

In the method of this invention, there will be used a dry jet-wet spinning or wet spinning process. In the dry jet-wet spinning process, the spinning solution is initially extruded into, and passed through, the space of a predetermined length and then led into the coagulating bath.

When, as taught in the prior art, a liquid having intensive coagulating action, for example, water, is used as the core liquid in the dry jet-wet spinning, the gellation of the spinning solution extruded from the double pipe orifice is rapidly developed due to the intensive coagulating action of the core liquid. As a result, spinnability is very poor and a desirable draft cannot be obtained. The hollow fiber can be produced only at a low speed.

In contrast to this, a feature of the present invention is that the core liquid is substantially the same as the solvent of the high molecular compound in the sheath solution, or is a swelling agent (a liquid having swelling action on the high molecular weight compound). The core liquid of this invention causes little or no coagulation and gellation of the spun filament.

We have found that hollow fibers having a uniform cross-section, which is a true circle, can be manufactured with excellent spinnability by using a core solution having solvent power or swelling power. For example, dimethylsulfoxide (DMSO, a solvent for polymers of acrylonitrile) or an aqueous DMSO solution can be used as a core liquid to produce the hollow fiber of this invention by dry jet-wet spinning.

The reason for the successful result is considered to be as follows:

First, the spinning solution extruded from the annular slit has a high viscosity such as 200 to 2000 poises because it is a high polymer solution. In the dry jet-wet spinning, the spinning filament runs naturally downward, since the spinning solution is extruded downward from the orifice substantially in the vertical direction.

Although the core liquid is compatible with the spinning solution, the core liquid itself has its inertia to flow down in the vertical direction as long as there is no strong agitation. Thus, the core liquid cannot be mixed with the viscous spinning solution in a short time while the running dope filament passes through the gaseous space before being introduced into the coagulation bath. In the dry jet-wet spinning process, the dwell time of the running dope filament in the space before the coagulating bath is at most 0.01 sec. to 5.0 sec. and, more particularly, 0.1 sec. to 0.3 sec. During such a short time, the core liquid flowing downwardly because of inertia cannot be mixed with the viscous spinning solution flowing downward. The spun dope solution involving the core liquid is introduced into the coagulating bath in a geometrical mode similar to that in which it was spun at the orifice.

In the method of manufacturing the hollow fiber according to this invention, the spinning solution is not gelled during the dry-passage in the space. For this reason, the spinnability is excellent and the draft ratio can be surprisingly high. Thus, the hollow fiber can be stably manufactured at high speed.

Immediately after the spun dope filament is introduced into the coagulating bath, coagulation starts by the action of the coagulating liquid ($H_2O$ or mainly $H_2O$). The coagulating liquid (water) penetrates into the hollow fiber membrane from its external surface to form a structure having desired permeability. During the coagulating process, the core solvent in the hollow portion is rapidly substituted (replaced) by water (coagulating liquid), reducing the solubility of the polymer in the core solution. Thus, the coagulated hollow fiber can be stably taken up on a take-up roll.

In the dry jet-wet spinning, the dry-passage before the coagulation bath is normally 5 mm to 100 cm. Of course, it may be more, for example, 6 m to 10 m.

This invention can also be applied to the usual wet-spinning process in which the orifice is immersed in the coagulating bath. The spun filament from the double pipe orifice immediately contacts the coagulating liquid. Accordingly, the spun dope is immediately gelled and, therefore, the spinning speed is lower than that for dry jet-wet spinning. However, the spinning speed is higher than that in the conventional method. The reason is presumably that the solvent or swelling agent in the core liquid infiltrates into the hollow fiber membrane from its interior while gellation occurs from its exterior and so the degree of gellation is suppressed to some extent so as to effect better spinnability.

Polyacrylonitrile and acrylonitrile copolymers containing at least 60% by weight of acrylonitrile and mixtures thereof are excellently adapted for use as the high molecular weight compound in this invention.

Operable monomers for copolymerization with acrylonitrile to make said high molecular weight compound include, but are not limited to, vinyl acetate, methyl acrylate, ethyl acrylate, methyl methacrylate, vinylpyridine, vinylbenze sulfonic acid, and styrene and any other copolymerizable vinyl monomer which is copolymerizable with acrylonitrile.

Any organic solvent into which the above-described high molecular weight compound (high molecular weight polymer) can be dissolved to form a spinning solution may be used in this invention. For example, a strong polar aprotic organic solvent such as dimethylformamide, dimethylacetamide, dimethylsulfoxide and hexamethylphosphoramide can be used as solvent in the spinning solution.

In the present invention, contrary to the general practice in this field, the above-described solvents for the spinning solution can also be used as the core liquid. In addition, materials which are able to swell the polymer in the spinning solution may also be used as core liquid. Formamide, acetic acid, γ-butyrolactone, ethylene carbonate, N-methyl pyrrolidone, γ-pyrrolidone, polyvinyl pyrrolidone, polyethylene glycol, polypropylene glycol or the like can be used as core liquids.

A swelling agent which produces the "degree of swelling" defined below can be used as core liquid.

The degree of swelling, "SWD", is:

$$SWD = [(Ws - Wo)/Wo] \times 100,$$

wherein Wo represents the weight of the film sample of the polymer (5 cm × 5 cm square, 0.5 mm thickness) and Ws represents the weight of the film sample after immersion into the test liquid at 25° C. for 24 hours. Before determining the weight of the swollen film, the surface of the sample was lightly pressed with a filter paper to remove the liquid on the surface of the film.

A swelling agent which has an SWD of at least 5 is normally used in this invention. However, the SWD is preferably more than 10 and, more preferably, more than 15. The swelling agent need not be a pure organic material. It may be an aqueous solution containing an organic swelling agent.

A core liquid containing both the above-described solvent and swelling agent may be used for this invention.

Another material may be added to the spinning solution in order to impart desirable selective permeability to the hollow fiber in accordance with the use purpose. This kind of additive is usually a material having a swelling effect on the polymer in the spinning solution.

To distinguish the core liquid and this kind of additive to the spinning solution, both of which have the swelling effect, we use the word "dope additive" hereafter as the additive for the spinning solution. Operable dope additives for polyacrylonitrile and acrylonitrile copolymers include, but are not limited to, formamide, acetic acid, γ-butyrolactone, ethylene carbonate, N-methyl pyrrolidone, γ-pyrrolidone, polyvinyl pyrrolidone, polyethylene glycol, polypropylene glycol.

The kind and amount of the dope additive may be determined in accordance with the required performance of the hollow fiber. Two or more kinds of the dope additive may be used as the occasion demands. The amount of the dope additive depends upon the kind of solvent of the spinning solution, the concentration of the polymer in the solution and the required performance of the hollow fiber. Accordingly, it cannot be generally determined; it can only be determined for each individual application. However, the amount of the above-mentioned organic dope additives is normally 5 to 65%.

A non-solvent for the high molecular weight compound (e.g., water, ethanol or methanol) or a mixture of two or more such non-solvents may be added to the spinning solution within the range in which the polymer can be dissolved in the solvent. The non-solvent may change the solubility of the solute to effect the dimensional configuration and aggregation phenomena of the polymer molecules in the spinning solution. This influences the coagulation behavior in the fiber-forming process and hence the permeability of the resultant hollow fiber.

As described in detail, the method of this invention is new and superior to the conventional method in the point that a uniform hollow microporous fiber having a high permeability to water can be stably manufactured at appreciable high speed. Moreover, the hollow fiber produced according to this invention has a good selective permeability. The important point of this invention lies in the fact that a solvent or swelling agent for the polymer is used as the core liquid. The core liquid in this invention plays an important role in giving a desired permeability to the resultant hollow fiber.

The core liquid of this invention is distinguished over those of the prior art which are discussed under the heading "Category II", supra, in that (a) spinning solutions of the prior art are gelled or coagulated when brought into contact with the core liquids described in Category II, but (b) the spinning solution of this invention (a solution of a polymer or copolymer of acrylonitrile in an organic solvent) is not gelled or coagulated when brought into contact with the core liquid of this invention (even when such core liquid contains water, methanol or ethanol, which are known coagulating agents for solutions of polymers and copolymers of acrylonitrile in organic solvents) because the core liquid of this invention contains an amount of an organic solvent and/or an organic swelling agent for such polymer effective for preventing gelling or coagulation when the spinning solution is brought into contact with the core liquid. That is to say that the core liquid of this invention contains an amount of (i) an organic solvent for said polymer, (ii) an amount of an organic swelling agent for said polymer, or (iii) a combined amount of such organic solvent and such organic swelling agent that the spinning solution of this invention is not gelled coagulated when brought into contact with the core liquid of this invention, while the core liquids of Category II do not contain such amount of organic solvent and/or organic swelling agent.

To explain the characteristic feature of this invention, let us consider the process of forming a polyacrylonitrile (or an arcylonitrile copolymer) hollow fiber, in which dimethylsulfoxide (DMSO) or a mixture containing DMSO in which DMSO is one of the ingredients (with water, ethanol, methanol or a mixture of at least two of these being another ingredient) is used as core liquid. In the coagulating bath, DMSO penetrates into the gelling fiber membrane from the hollow inner portion thereof. Needless to say, DMSO functions to swell the membrane which comprises the wall of the hollow fiber to effectively form numerous micro-pores communicated with each other in said membrane. When a dope additive, which is usually a swelling agent for such a polymer of acrylonitrile, is present in the spinning solution, the dope additive is removed therefrom by the coagulating liquid (which is water or mainly water) comprising the coagulating bath. However, according to this invention, DMSO infiltrates into the coagulating dope filament (or coagulating doped spinning solution) from the core liquid during the gellation so that the concentration of the swelling agent in the forming membrane (or forming hollow fiber) is maintained at a relatively high concentration. This explains why the swelling core liquid of this invention has such a great influence on the resulting membrane structure of the hollow fiber. In such coagulating process, the coagulating liquid (water) moves into the gelled membrane and then into the core liquid from the external surface of the forming hollow fiber, DMSO in the core liquid is then diluted to reduce its solvent function. Since DMSO is readily soluble in water, it can be easily washed out with water. When the produced hollow fiber is used in the medical field or in the food insutry, it is very important that the core liquid can be easily removed therefrom by washing with water. This is a feature of the present invention.

According to this invention, water or an aqueous solution in which water is a major component is used as the coagulating liquid. The aqueous solution in the coagulating bath may be a mixture of water and spinning solvent, water and dope additive or of water, dope additive and the solvent for the polymer (high molecular weight compound). In the dry jet-wet spinning process, the amount of water in the coagulating bath is preferably more than 50% by volume. Normally, the hollow fiber coagulated in the coagulating bath is sequentially introduced into a water-washing process. The coagulation is usually completed in the water-washing process.

Examples of preferred spinning solvents (solvents in which the high molecular weight compound comprising a solute is dissolved to form the spinning solution) are dimethylformamide (DMF), dimethylacetamide (DMA), DMSO or hexamethylphosphoramide (HMPA).

The instant invention will be better understood by referring to the following specific but non-limiting examples. It is understood that said invention is not limited to these examples, which are offered merely as illustrations. It is also understood that modifications can be made without departing from the spirit or scope of this invention.

EXAMPLE 1

Acrylonitrile-methylacrylate polymer (93:7) was dissolved in dimethylacetamide to prepare a spinning solution. A hollow fiber was spun by dry jet-wet spinning wherein the spinning solution was extruded downward from the annular slit of a double pipe orifice substantially in the vertical direction. The core liquid was DMA. DMA was simultaneously ejected from the inner orifice (inner pipe) of the double pipe orifice. The inner pipe was concentrically positioned in the annular slit. Thus, a hollow spinning dope filament was produced. This spinning dope filament from the orifice was run through a gaseous space of 30 cm and then it was introduced into a water bath (coagulating bath) where the filament was coagulated.

The resulting fiber was stably spun at the speed of 160 m/min, and the resulting hollow fiber was satisfactorily uniform.

When water was used as core liquid for comparison, the spinnability was greatly deteriorated because of the gelling action of the water, and the spinning speed was at most 10 m/min. When methanol was used as core liquid, the spinning speed was at most 13 m/min.

EXAMPLE 2

The experimental conditions were the same as in the Example 1, except that formamide was used as core liquid. The hollow fiber was stably spun at the high speed of 140 m/min. The cross-section of the produced hollow fiber was close to true circle. The thickness of the hollow fiber was constant.

EXAMPLE 3

Acrylonitrile-methacrylate copolymer was dissolved in dimethylformamide to prepare a spinning solution. The spinning solution was extruded from the annular slit of the double pipe orifice described in Example 1. A hollow fiber was manufactured in the conventional wet spinning process in which the orifice was immersed in the coagulation bath. A 30% aqueous solution of dimethylformamide was used as the coagulating bath.

Two runs were made using dimethylacetamide and dimethylsulfoxide, respectively, as core liquids. The spinning speeds were 28 m/min and 29 m/min for dimethylacetamide and dimethylsulfoxide, respectively. These spinning speeds were surprisingly high for the wet-spinning of acrylonitrile copolymer.

When water was used as core liquid for comparison, the spinning speed was at most 12 m/min. When ethanol was used as the core liquid, the spinning speed was at most 15 m/min. Thus, the improved effect produced by this invention was directly proven.

While there has been described preferred embodiments of this invention, obviously further modifications and variations are possible in light of the above teachings. It is, therefore, to be understood that with the scope of the appended the claims, the invention may be practiced otherwise than as specifically described.

The coagulating bath used in the process of this invention is preferably substantially free of inorganic acid. More preferably, said coagulating bath is free of inorganic acid.

What is claimed is:

1. A method of manufacturing a hollow fiber comprising the steps of:
   (a) extruding a spinning solution of high molecular weight compound from an annular slit, said high molecular weight compound consisting of at least one of polyacrylonitrile and acrylonitrile copolymer;
   (b) simultaneously extruding a core liquid comprising an least one of formamide, acetic acid, γ-butyrolactone, ethylene carbonate, N-methyl pyrrolidone and α-pyrrolidone which are non-coagulants for said spinning solution from an orifice encircled by said annular slit; and
   (c) then introducing said extruded spinning solution with said core liquid into a coagulating bath containing water or mainly water, said spinning solution being coagulated in said coagulating bath.

2. In a method for manufacturing a microporous hollow fiber having a high permeability to water comprising extruding from an annular slit a spinning solution consisting essentially of (a) a solvent selected from the group consisting of dimethylformamide, dimethylacetamide, dimethylsulfoxide, and hexamethylphosphoramide, and (b) 10 to 35% by weight of a solute, said solute being at least one high molecular weight compound selected from the group consisting of polyacrylonitrile and an acrylonitrile copolymer while simultaneously extruding a core liquid from an orifice encircled by said annular slit, and introducing the extruded spinning solution with said core liquid into a coagulating bath comprising an amount of water effective for coagulating the spinning solution, said spinning solution being coagulated in said coagulating bath to form said microporous hollow fiber having a high permeability to water, the improvement comprising using a core liquid which contains an amount of at least one member selected from the group consisting of formamide, acetic acid, γ-butyrolactone, ethylene carbonate, N-methyl pyrrolidone and α-pyrrolidone effective for preventing said core liquid from coagulating said spinning solution.

3. In a method of manufacturing a hollow fiber comprising the steps of:
   (a) extruding a spinning solution containing a high molecular weight compound in a concentration of 10 to 35% by weight in an organic solvent from an annular slit, said high molecular weight compound consisting of at least one member selected from the group consisting of polyacrylonitrile and an acrylonitrile copolymer, said organic solvent being dimethylformamide, dimethylacetamide, dimethylsulfoxide or hexamethylphosphoramide;
   (b) simultaneously extruding a core liquid from an orifice encircled by said annular slit; and
   (c) introducing said extruded spinning solution with said core liquid into a coagulating bath containing water or mainly water, said spinning solution being coagulated in said coagulating bath to form said hollow fiber;
   the improvement comprising selecting the core liquid from at least one member of the group consisting of formamide, acetic acid, γ-butyrolactone, ethylene carbonate, N-methyl pyrrolidone and α-pyrrolidone.

4. The method of any one of claims 1, 3 or 2 in which the high molecular weight compound is an acrylonitrile copolymer consisting essentially of at least 60% by weight of an acrylonitrile.

5. The method of any one of claims 1, 3 or 2 in which the high molecular weight compound is a copolymer of acrylonitrile and at least one member selected from the group consisting of vinyl acetate, methyl acrylate, ethyl acrylate, methyl methacrylate, vinylpyridine, vinylbenze sulfonic acid and styrene.

6. The method of claim 5 in which the copolymer of acrylonitrile comprises at least 60% by weight of acrylonitrile.

7. The method of any one of claims 1, 3 or 2 in which the high molecular weight compound is polyacrylonitrile.

8. The method of claim 1 in which the core liquid is formamide.

9. A method according to any one of claims 1, 3 or 2 in which said spinning solution and said core liquid pass through a predetermined space for 0.01 to 5 seconds after exit from said annular slit and said orifice, respectively, and before being introduced into said coagulating bath.

10. The process of claim 2 in which the coagulating bath is free or substantially free of inorganic acid.

* * * * *